United States Patent
Radhakrishnan et al.

(10) Patent No.: US 9,015,648 B2
(45) Date of Patent: Apr. 21, 2015

(54) ROUNDTRIP MERGE OF BPEL PROCESSES AND BPMN MODELS

(75) Inventors: Ganesh Radhakrishnan, San Mateo, CA (US); Lili Liu, Santa Clara, CA (US); Anurag Aggarwal, Sunnyvale, CA (US); Vishal Saxena, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1507 days.

(21) Appl. No.: 12/200,762

(22) Filed: Aug. 28, 2008

(65) Prior Publication Data

US 2010/0057482 A1  Mar. 4, 2010

(51) Int. Cl.
*G06F 9/44* (2006.01)
*G06Q 10/06* (2012.01)

(52) U.S. Cl.
CPC .............. *G06Q 10/06* (2013.01); *G06Q 10/067* (2013.01)

(58) Field of Classification Search
CPC .................................................... G06Q 10/067
USPC .......................................................... 717/104
See application file for complete search history.

(56) References Cited

U.S. PATENT DOCUMENTS

| | | | |
|---|---|---|---|
| 7,209,933 B2 | 4/2007 | Saxena | |
| 2005/0209993 A1* | 9/2005 | Koehler | 707/1 |
| 2007/0073567 A1* | 3/2007 | Challapalli | 705/8 |
| 2007/0162486 A1* | 7/2007 | Brueggemann et al. | 707/102 |
| 2008/0052384 A1* | 2/2008 | Marl et al. | 709/223 |
| 2008/0301684 A1* | 12/2008 | Barros et al. | 718/102 |
| 2009/0089078 A1* | 4/2009 | Bursey | 705/1 |
| 2009/0133019 A1* | 5/2009 | Dumas et al. | 718/100 |
| 2009/0265684 A1* | 10/2009 | Fuchs et al. | 717/105 |
| 2009/0327199 A1* | 12/2009 | Weber et al. | 706/48 |

OTHER PUBLICATIONS

Recker, Jan and Mendling, Jan. "On the Translation between BPMN and BPEL: Conceptual Mismatch between Process Modeling Languages". Technical Report, QUT ePrints, ID Code—4637, Jul. 2006. pp. 1-12.*

Bridging the Gap Between Business & IT With BPMN & BPEL, obtained at http://soa.sys-con.com/node/492520, Retrieved Sep. 4, 2008.

Things BPMN—Vishal's BPM Corner, obtained at http://vishals.blogspot.com/, Retrieved Aug. 28, 2008, last updated Aug. 12, 2008.

* cited by examiner

*Primary Examiner* — Henry Tsai
*Assistant Examiner* — John Roche
(74) *Attorney, Agent, or Firm* — Trellis IP Law Group, PC

(57) ABSTRACT

In one embodiment, a method of performing a merge operation can include: mapping a business process modeling notation (BPMN) model to a business process execution language (BPEL) model; modifying the BPMN model to form a modified BPMN model; modifying the BPEL model to form a modified BPEL model; when the merge operation is a forward merge operation: exporting the modified BPMN model to an exported BPEL model; performing an activity level outline merge for added information technology (IT) scopes and branches from the modified BPEL model; performing an activity level detail merge for added IT details from the modified BPEL model; and performing an attribute level merge for updated branch conditions in the merged BPEL model; and when the merge operation is a reverse merge operation, adding scopes and branches from the modified BPEL model to the BPMN model.

14 Claims, 12 Drawing Sheets

ROUNDTRIP MERGE OF BPEL PROCESSES AND BPMN MODELS

BACKGROUND

Business processes designed by business analysts are generally implemented as part of applications or information technology (IT) systems by IT developers. For example, business processes may be designed using business process modeling notation (BPMN), and corresponding IT applications can be implemented using business process execution language (BPEL).

In typical operations, the business processes being designed (e.g., BPMN models), as well as the corresponding executable IT implementations (e.g., BPEL models) may undergo several iterations. During the course of such iterations, the models may undergo continuous changes over independent model lifecycles from the business process side and/or the IT developer side. As a result, the models may not always fully correspond, and can become out of synchronization.

SUMMARY

In one embodiment, a method of performing a merge operation can include: mapping a BPMN model to a BPEL model; modifying the BPMN model to form a modified BPMN model; modifying the BPEL model to form a modified BPEL model; when the merge operation is a forward merge operation: exporting the modified BPMN model to an exported BPEL model; performing an activity level outline merge for added IT scopes and branches from the modified BPEL model; performing an activity level detail merge for added IT details from the modified BPEL model; and performing an attribute level merge for updated branch conditions in the merged BPEL model; and when the merge operation is a reverse merge operation, adding scopes and branches from the modified BPEL model to the BPMN model.

A further understanding of the nature and the advantages of particular embodiments disclosed herein may be realized by reference of the remaining portions of the specification and the attached drawings.

DETAILED DESCRIPTION OF EMBODIMENTS

Figure 1:
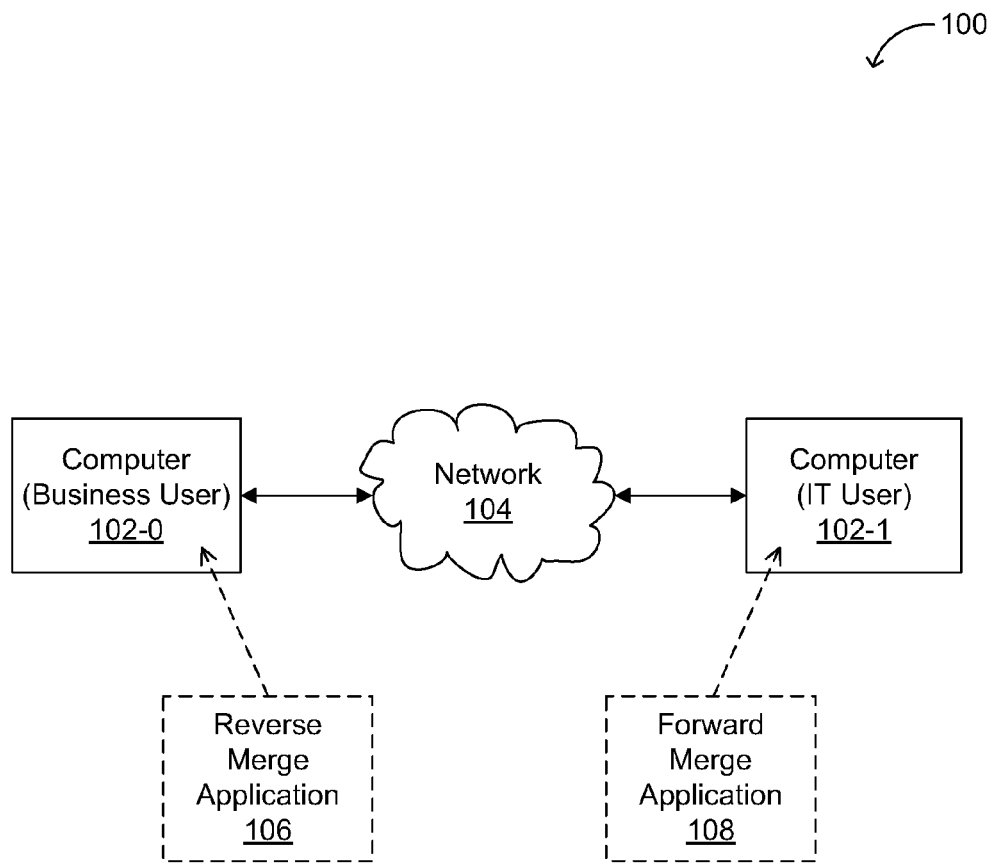
FIG. 1 illustrates an example system having merge applications in accordance with embodiments of the present invention.

Business Process Modeling Notation (BPMN) is a standardized graphical notation for drawing business processes in a workflow. BPMN was developed by the Business Process Management Initiative (BPMI), and is now being maintained by the Object Management Group. The primary goal of BPMN is to provide a standard notation that is readily understandable by business stakeholders. These business stakeholders include the business analysts who create and refine the processes, the technical developers responsible for implementing the processes, and the business managers who monitor and manage the processes. Consequently, BPMN is intended to serve as common language to bridge the communication gap that frequently occurs between business process design and implementation.

Currently, there are many business process modeling languages, tools and methodologies. The adoption of the BPMN standard notation helps to unify the expression of basic business process concepts (e.g., public and private processes, choreographies, etc.), as well as advanced modeling concepts (e.g., exception handling, transaction compensation, etc.). Thus, BPMN can be thought of as defining the "what" and the "when" of business processes.

As defined in the abstract of the Web Services Business Process Execution Language OASIS Standard WS-BPEL 2.0, WS-BPEL (or "BPEL" for short) is a language for specifying business process behavior, e.g., based on web services. Processes in BPEL can export and import functionality by using web service interfaces. BPEL may also include both extensible markup language (XML) and graphical formats or representations, which provide visual images of XML "snippets."

BPEL provides a language for the specification of both executable (e.g., via XML) and abstract business processes. By doing so, it extends the web services interaction model and enables it to support business transactions. BPEL defines an interoperable integration model that should facilitate the expansion of automated process integration in both the intra-corporate and the business-to-business spaces. Thus, BPEL can be thought of as defining the "how" of business processes. Examples of graphical representations of BPMN and BPEL models are shown below in FIGS. 11 and 12.

Due to the above reason BPMN and BPEL are often used in conjunction for business process definition and implementation, respectively. Under such a situation, though the mapping of the BPMN activities to BPEL might be somewhat straightforward, intelligently translating changes from one model (e.g., a BPMN model) to its counterpart (e.g., a BPEL model) so as to maintain these models in sync is a difficult task. Doing the same without losing information makes the task even more challenging.

Traditional business process modeling and/or execution systems may not seamlessly translate changes from one model representation (say BPMN) to a different model representation (say BPEL). Thus, a lack of synchronization may come to exist between the business process (e.g., BPMN model), and its corresponding executable information technology (IT) process (e.g., BPEL model). As used herein, a business user may be someone who defines the "what" and the "when" of business processes, such as by defining a business flow outline using BPMN. Also, an IT user may be someone who defines the "how" of a business process by implementing the business flow (e.g., using BPEL).

Particular embodiments allow close collaboration between the business users who define the Business Process Outline and IT users who provide the business process implementation, to accommodate software and/or routines that solve business problems. Particular embodiments support a "forward" merge, such as where changes are propagated from a BPMN model to a BPEL model, as well as a "reverse" merge where changes are propagated from a BPEL model to a BPMN model. In this fashion, an intelligent merging of such models accommodates synchronization between the business process and corresponding IT development.

Referring now to FIG. 1, shown is an example system 100 having merge applications in accordance with embodiments of the present invention. Particular embodiments may include application software with forward and/or reverse merge capability. In the example of FIG. 1, a reverse merge application 106 may be loaded on computer 102-0 for a business user. This is because the business user would be particularly concerned with any updates made by an IT user being reflected in the BPMN model of the business user.

Similarly, a forward merge application 108 may be loaded on computer 102-1 for an IT user. This allows the IT user (e.g., at computer 102-1) to see corresponding updates in the BPEL model that result from changes in the business process BPMN model made by business user (e.g., at computer 102-0). Computers 102-0 and 102-1 may also communicate via a network 104 (e.g., the Internet, a virtual private network (VPN), a wide area network (WAN), a local area network (LAN), etc.). Computers 102 can include any type of computing device (e.g., a portable computing device, a laptop, a personal computer (PC), etc.).

Figure 2:
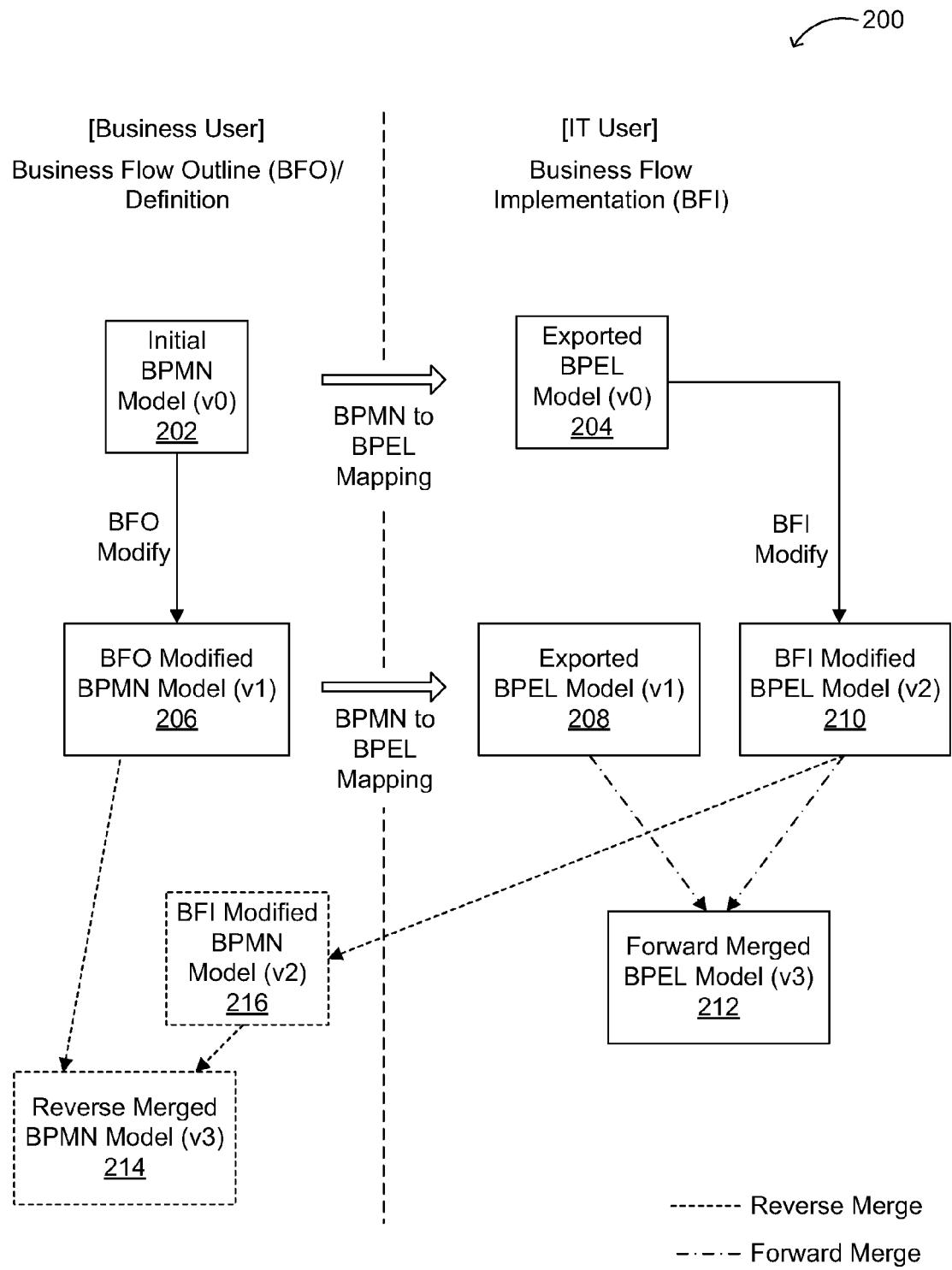
FIG. 2 illustrates example forward and reverse merges in accordance with embodiments of the present invention.

Referring now to FIG. 2, shown are example 200 forward and reverse merges in accordance with embodiments of the present invention. As part of defining a business flow outline (BFO), a business user may develop an initial BPMN model (version 0) 202. Initial BPMN model (version 0) 202 may be mapped or otherwise converted into exported BPEL model (version 0) 204. Such a BPEL model may represent a business flow implementation (BFI), and can be represented using XML language, as well as specific graphical forms. Examples of XML snippets (see tables below) and graphical representations of BPEL will be shown in subsequent figures.

For example, modifications can be made to the BFO (e.g., by a business user), as well as to the BFI (e.g., by an IT user). Thus, a new version (version 1) of the BPMN model can be formed as BFO modified BPMN model (version 1) 206, which can also be mapped to a corresponding exported BPEL model (version 1) 208. On the IT user side, exported BPEL model (version 1) 204 can be modified to form BFI modified BPEL model (version 2) 210.

In a forward merge operation, changes made to a business flow outline can be merged into a business flow implementation. For example, exported BPEL model (version 1) 208 and BFI modified BPEL model (version 2) 210 can be merged to form forward merged BPEL model 212 (version 3). In a reverse merge operation (see dashed boxes 214 and 216), changes made to a business flow implementation can be merged into a business flow outline. For example, BFO modified BPMN model (version 1) 206 and BFI modified BPEL model (version 2) 210, as converted to BFI modified BPMN model (v2) 216, can be merged to form reverse merged BPMN model 214 (version 3).

Figure 3:
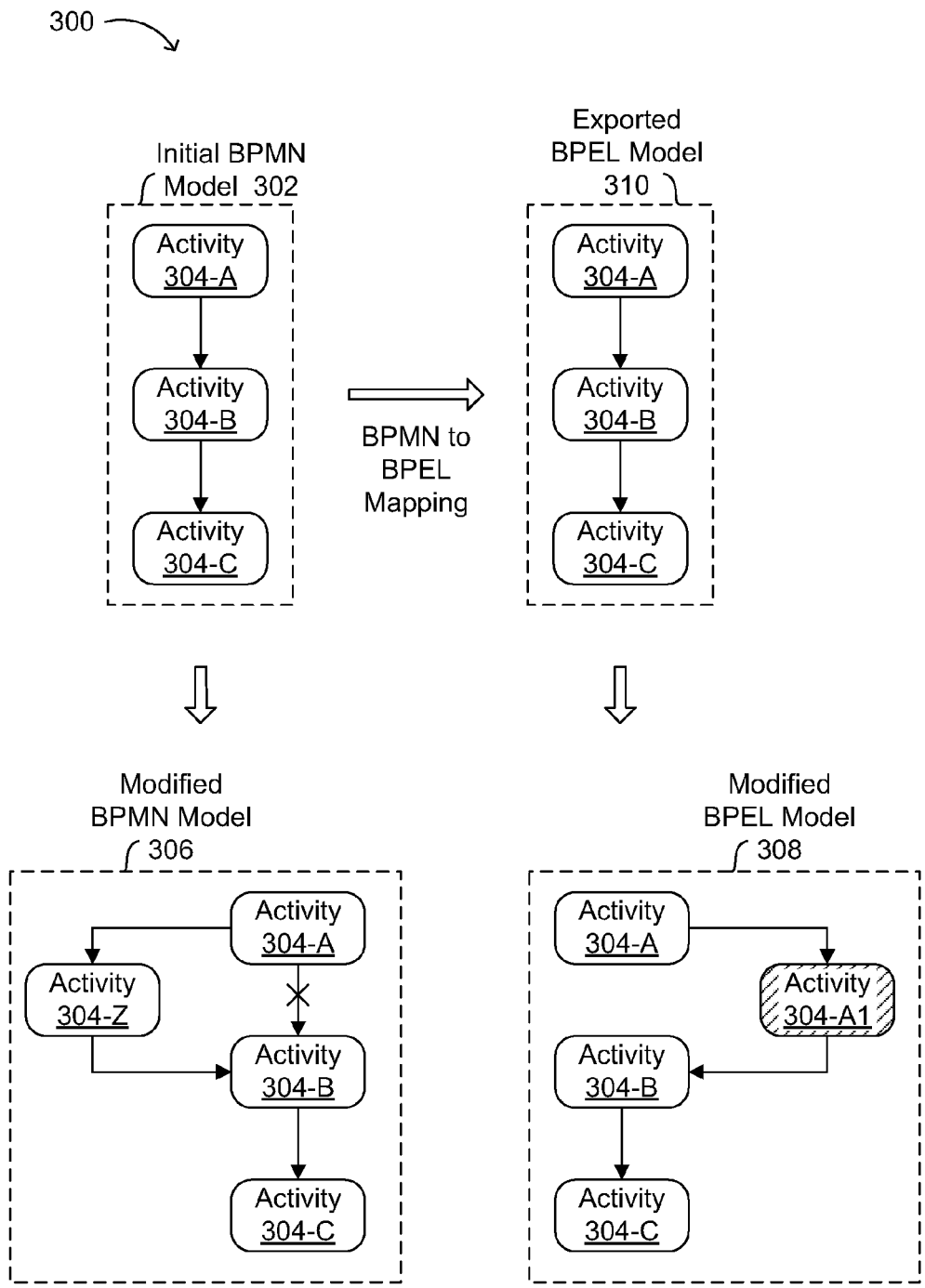
FIG. 3 illustrates example BPMN and BPEL models suitable for use in accordance with embodiments of the present invention.

Referring now to FIG. 3, shown are example 300 BPMN and BPEL models suitable for use in accordance with embodiments of the present invention. Initial BPMN model 302 can include a flow chart for capturing business requirements in outline form, such as including activities 304-A, 304-B, and 304-C. Extensions may also be used to indicate if a particular activity 304 is a human activity, a machine activity, or any other suitable and definable activity. For example, a business user may use a collection of activities 304 in model 302 for an expense request approval business process. In this case, a human activity may be identification of a person that is to approve the expense, whereby notifications can be sent as to approval/rejections, and the like.

A flag, blueprint, or other suitable indication, can convey that BPMN model 302 is ready for conversion or mapping to exported BPEL model 310 such that IT developers can implement executable code therefrom. Any suitable rules for mapping or exporting from BPMN to BPEL can be used in particular embodiments. As shown in the particular example of FIG. 3, initial BPMN model 302 can be modified by a business user into modified BPMN model 306. For example, activity 304-Z may be added between activities 304-A and 304-B, as shown. Also in this example, an IT user may modify exported BPEL model 310 by adding activity 304-A1 as shown in modified BPEL model 308.

The exported BPEL model 310 is an example graphical representation (e.g., using the JDeveloper tool, provided by Oracle Corporation) of one or more XML snippets, which is the underlying executable language. For example, an XML snippet corresponding to exported BPEL model 310 is shown below in Table 1:

TABLE 1

```
<scope name="304-A">
    <bpelx:annotation>
      <bpelx:pattern patternName="bpelx:automated"></bpelx:pattern>
      <bpelx:analysis>
        <bpelx:property name="BusinessId">Scope_92e05a70</bpelx:property>
        <bpelx:property name="LastUpdateDate">6/13/08 3:10:53 PM</bpelx:property>
      </bpelx:analysis>
    </bpelx:annotation>
    <invoke name="304-A" partnerLink="CustomerDB"
        portType="ns1:CustomerInfoProvider" operation="getInfo"
        inputVariable="inputVar" outputVariable="CustomerInformation">
      <bpelx:annotation>
        <bpelx:analysis>
          <bpelx:property name="BusinessId">92e05a70</bpelx:property>
```

TABLE 1-continued

```
          <bpelx:property name="LastUpdateDate">6/13/08 3:10:53 PM</bpelx:property>
        </bpelx:analysis>
      </bpelx:annotation>
    </invoke>
</scope>
<scope name="304-B">
    <bpelx:annotation>
      <bpelx:pattern patternName="bpelx:automated"></bpelx:pattern>
      <bpelx:analysis>
        <bpelx:property name="BusinessId">Scope_399511dd</bpelx:property>
        <bpelx:property name="LastUpdateDate">6/13/08 3:10:53 PM</bpelx:property>
      </bpelx:analysis>
    </bpelx:annotation>
    <invoke name="304-B" partnerLink="CreditService"
        portType="ns2:CreditService" operation="initiate"
        inputVariable="CustomerInformation">
          <bpelx:annotation>
          <bpelx:analysis>
            <bpelx:property name="BusinessId">399511dd</bpelx:property>
            <bpelx:property name="LastUpdateDate">6/13/08 3:10:53 PM</bpelx:property>
          </bpelx:analysis>
        </bpelx:annotation>
    </invoke>
</scope>
<scope name="304-C">
    <bpelx:annotation>
      <bpelx:pattern patternName="bpelx:automated"></bpelx:pattern>
      <bpelx:analysis>
        <bpelx:property name="BusinessId">Scope_36af0200</bpelx:property>
        <bpelx:property name="LastUpdateDate">6/13/08 3:10:53 PM</bpelx:property>
      </bpelx:analysis>
    </bpelx:annotation>
    <receive name="304-C" partnerLink="CreditService"
        portType="ns2:CreditServiceCallback" operation="onResult"
        variable="CustomerInformation">
          <bpelx:annotation>
          <bpelx:analysis>
            <bpelx:property name="BusinessId">36af0200</bpelx:property>
            <bpelx:property name="LastUpdateDate">6/13/08 3:10:53 PM</bpelx:property>
          </bpelx:analysis>
        </bpelx:annotation>
    </receive>
</scope>
```

Similarly, the modified BPEL model 308 is also a graphical representation of one or more XML snippets constituting the BPEL model. For example, an XML snippet corresponding to the modified BPEL model 308 is shown below in Table 2:

TABLE 2

```
<scope name="304-A">
    <bpelx:annotation>
      <bpelx:pattern patternName="bpelx:automated"></bpelx:pattern>
      <bpelx:analysis>
        <bpelx:property name="BusinessId">Scope_92e05a70</bpelx:property>
        <bpelx:property name="LastUpdateDate">6/13/08 3:10:53 PM</bpelx:property>
      </bpelx:analysis>
    </bpelx:annotation>
    <invoke name="304-A" partnerLink="CustomerDB"
      portType="ns1:CustomerInfoProvider" operation="getInfo"
      inputVariable="inputVar" outputVariable="CustomerInformation">
        <bpelx:annotation>
          <bpelx:analysis>
            <bpelx:property name="BusinessId">92e05a70</bpelx:property>
            <bpelx:property name="LastUpdateDate">6/13/08 3:10:53 PM</bpelx:property>
          </bpelx:analysis>
        </bpelx:annotation>
    </invoke>
</scope>
<scope name="304-A1">
    <receive name="receiveInput" partnerLink="client"
        portType="client:BPELProcess5" operation="initiate"
        variable="inputVariable" createInstance="yes"/>
</scope>
<scope name="304-B">
    <bpelx:annotation>
      <bpelx:pattern patternName="bpelx:automated"></bpelx:pattern>
      <bpelx:analysis>
```

TABLE 2-continued

```
    <bpelx:property name="BusinessId">Scope_399511dd</bpelx:property>
    <bpelx:property name="LastUpdateDate">6/13/08 3:10:53 PM</bpelx:property>
   </bpelx:analysis>
  </bpelx:annotation>
  <invoke name="304-B" partnerLink="CreditService"
    portType="ns2:CreditService" operation="initiate"
    inputVariable="CustomerInformation">
    <bpelx:annotation>
     <bpelx:analysis>
     <bpelx:property name="BusinessId">399511dd</bpelx:property>
     <bpelx:property name="LastUpdateDate">6/13/08 3:10:53 PM</bpelx:property>
    </bpelx:analysis>
   </bpelx:annotation>
  </invoke>
 </scope>
 <scope name="304-C">
  <bpelx:annotation>
   <bpelx:pattern patternName="bpelx:automated"></bpelx:pattern>
   <bpelx:analysis>
    <bpelx:property name="BusinessId">Scope_36af0200</bpelx:property>
    <bpelx:property name="LastUpdateDate">6/13/08 3:10:53 PM</bpelx:property>
   </bpelx:analysis>
  </bpelx:annotation>
  <receive name="304-C" partnerLink="CreditService"
    portType="ns2:CreditServiceCallback" operation="onResult"
    variable="CustomerInformation">
    <bpelx:annotation>
     <bpelx:analysis>
     <bpelx:property name="BusinessId">36af0200</bpelx:property>
     <bpelx:property name="LastUpdateDate">6/13/08 3:10:53 PM</bpelx:property>
    </bpelx:analysis>
   </bpelx:annotation>
  </receive>
 </scope>
```

In a forward merge operation, BPMN model changes may be merged or propagated into the corresponding IT process blueprint or model (e.g., BPEL) in a substantially lossless fashion. In one example, each BPMN activity may be mapped to a corresponding BPEL "scope" or a logical collection of activities. Further, each BPMN activity may be uniquely identified by an identifier, and any changes to such activities can be captured via a timestamp or last update date. In addition, because a business user owns the process outline (e.g., BPMN model), an IT user may not typically delete activities in the outline of the business user. Instead, the IT user may make modifications by: (i) adding new BPEL or IT scopes between existing BPEL scopes representing process activities; and/or (ii) adding branches to existing switches and flows. Examples of these types of modifications will be shown below.

Figure 4:
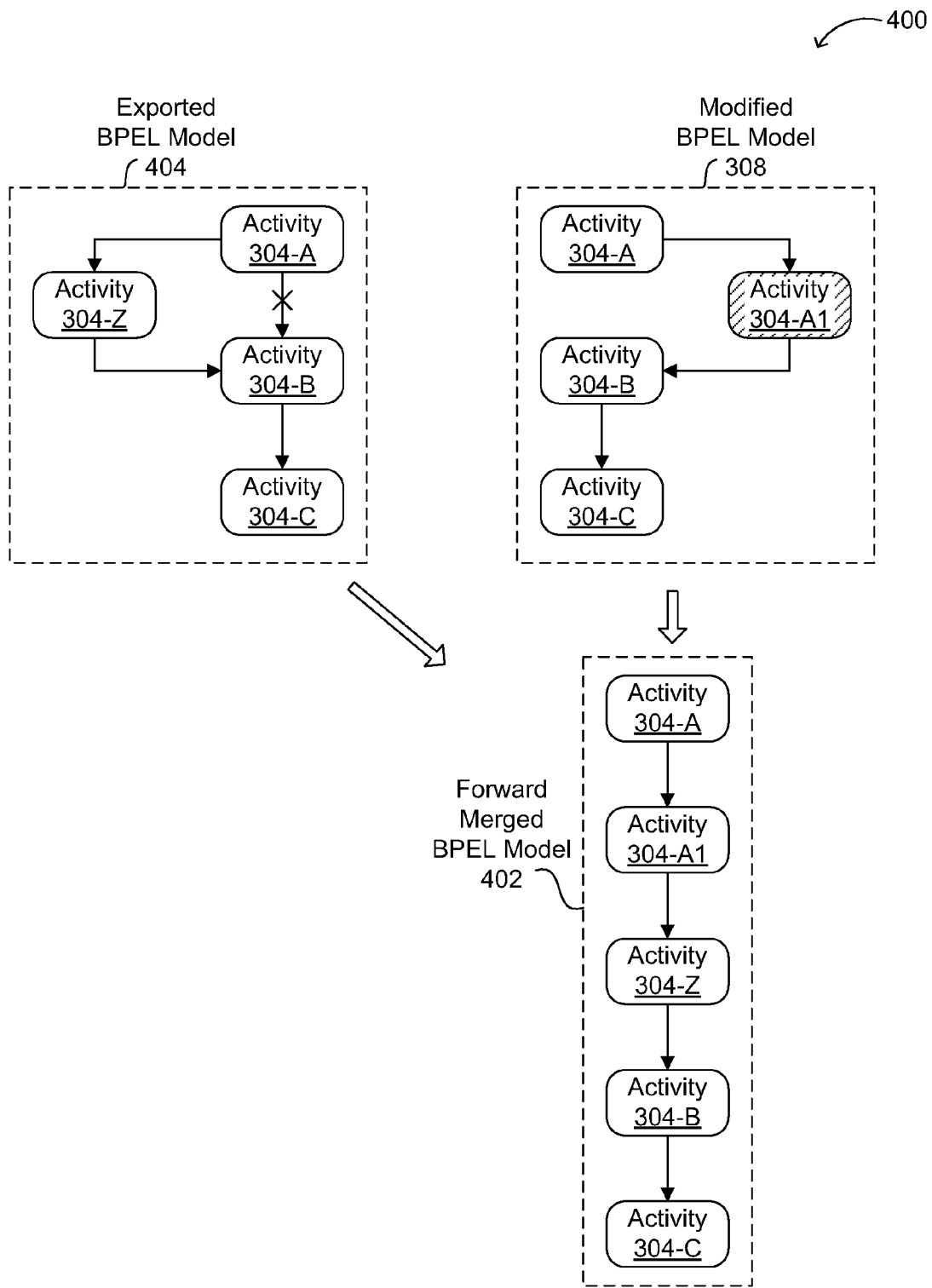
FIG. 4 illustrates a first example forward merge operation in accordance with embodiments of the present invention.

Referring now to FIG. 4, shown is an example forward merge operation 400 in accordance with embodiments of the present invention. In this example, the forward merge is shown, whereby each activity in a BPMN model is merged into a scope in a BPEL model. First, a modified BPMN model (e.g., 306 in FIG. 3) may be exported, mapped, or otherwise generated into a BPEL model (e.g., 404). In this fashion, comparisons can be made between BPEL models for the forward merge, where one of the models (e.g., exported BPEL model 404) reflects changes from a business user, and the other (e.g., modified BPEL model 308) reflects changes from an IT user.

As will be discussed in more detail below, an activity level forward merge may be accomplished by performing an outline merge followed by a detail merge. A resulting forward merged BPEL model 402 can include added activity 304-A1 from an IT user, as well as activity 304-Z from a business user. As shown, activity 304-A1 can be anchored to previous activity 304-A, and activity 304-Z can be anchored to activity 304-B. Details of such an anchoring procedure will be discussed in more detail below. Further, while forward merged BPEL model 402 is shown as separate from exported BPEL model 404, the merge operations can alternatively be performed directly on the exported BPEL model 404.

While forward merged BPEL model 402 is shown as an example graphical representation of one or more XML snippets representing the BPEL model, an XML snippet corresponding to the forward merged BPEL model 402 is shown below in Table 3:

TABLE 3

```
<scope name="304-A">
  <bpelx:annotation>
    <bpelx:pattern patternName="bpelx:automated"></bpelx:pattern>
    <bpelx:analysis>
     <bpelx:property name="BusinessId">Scope_92e05a70</bpelx:property>
     <bpelx:property name="LastUpdateDate">6/13/08 3:10:53 PM</bpelx:property>
    </bpelx:analysis>
  </bpelx:annotation>
  <invoke name="304-A" partnerLink="CustomerDB"
    portType="ns1:CustomerInfoProvider" operation="getInfo"
    inputVariable="inputVar" outputVariable="CustomerInformation">
    <bpelx:annotation>
```

TABLE 3-continued

```
      <bpelx:analysis>
        <bpelx:property name="BusinessId">92e05a70</bpelx:property>
        <bpelx:property name="LastUpdateDate">6/13/08 3:10:53 PM</bpelx:property>
      </bpelx:analysis>
    </bpelx:annotation>
  </invoke>
</scope>
<scope name="304-A1">
  <receive name="receiveInput" partnerLink="client"
      portType="client:BPELProcess5" operation="initiate"
      variable="inputVariable" createInstance="yes"/>
</scope>
<scope name="304-Z">
  <bpelx:annotation>
    <bpelx:pattern patternName="bpelx:automated"></bpelx:pattern>
    <bpelx:analysis>
      <bpelx:property name="BusinessId">Scope_31fb937f</bpelx:property>
      <bpelx:property name="LastUpdateDate">6/13/08 3:10:53 PM</bpelx:property>
    </bpelx:analysis>
  </bpelx:annotation>
  <invoke name="304-Z">
    <bpelx:annotation>
      <bpelx:analysis>
        <bpelx:property name="BusinessId">31fb937f</bpelx:property>
        <bpelx:property name="LastUpdateDate">6/13/08 3:10:53 PM</bpelx:property>
      </bpelx:analysis>
    </bpelx:annotation>
  </invoke>
</scope>
<scope name="304-B">
  <bpelx:annotation>
    <bpelx:pattern patternName="bpelx:automated"></bpelx:pattern>
    <bpelx:analysis>
      <bpelx:property name="BusinessId">Scope_399511dd</bpelx:property>
      <bpelx:property name="LastUpdateDate">6/13/08 3:10:53 PM</bpelx:property>
    </bpelx:analysis>
  </bpelx:annotation>
  <invoke name="304-B" partnerLink="CreditService"
      portType="ns2:CreditService" operation="initiate"
      inputVariable="CustomerInformation">
    <bpelx:annotation>
      <bpelx:analysis>
        <bpelx:property name="BusinessId">399511dd</bpelx:property>
        <bpelx:property name="LastUpdateDate">6/13/08 3:10:53 PM</bpelx:property>
      </bpelx:analysis>
    </bpelx:annotation>
  </invoke>
</scope>
<scope name="304-C">
  <bpelx:annotation>
    <bpelx:pattern patternName="bpelx:automated"></bpelx:pattern>
    <bpelx:analysis>
      <bpelx:property name="BusinessId">Scope_36af0200</bpelx:property>
      <bpelx:property name="LastUpdateDate">6/13/08 3:10:53 PM</bpelx:property>
    </bpelx:analysis>
  </bpelx:annotation>
  <receive name="304-C" partnerLink="CreditService"
      portType="ns2:CreditServiceCallback" operation="onResult"
      variable="CustomerInformation">
    <bpelx:annotation>
      <bpelx:analysis>
        <bpelx:property name="BusinessId">36af0200</bpelx:property>
        <bpelx:property name="LastUpdateDate">6/13/08 3:10:53 PM</bpelx:property>
      </bpelx:analysis>
    </bpelx:annotation>
  </receive>
</scope>
```

In performing the merge, two Hash Maps may be constructed. A Hash Map is a data structure, which is often used to store key-value pairs, where every value is uniquely identified using the hash code of its key. This makes it very easy and less time consuming to retrieve the value, provided the key is known. In particular embodiments, Hash Maps can be used to reference BPEL model Objects using their ids as the key. One such hash map may be created for the BPEL model generated from the BPMN model (e.g., exported BPEL model 404), and another hash map may be generated for the BPEL implementation model (e.g., modified BPEL model 308) available via an IT user. Each of these hash maps can map unique identifiers of each activity in a model with the activity itself and help in accomplishing activity level forward merge.

Figure 5:
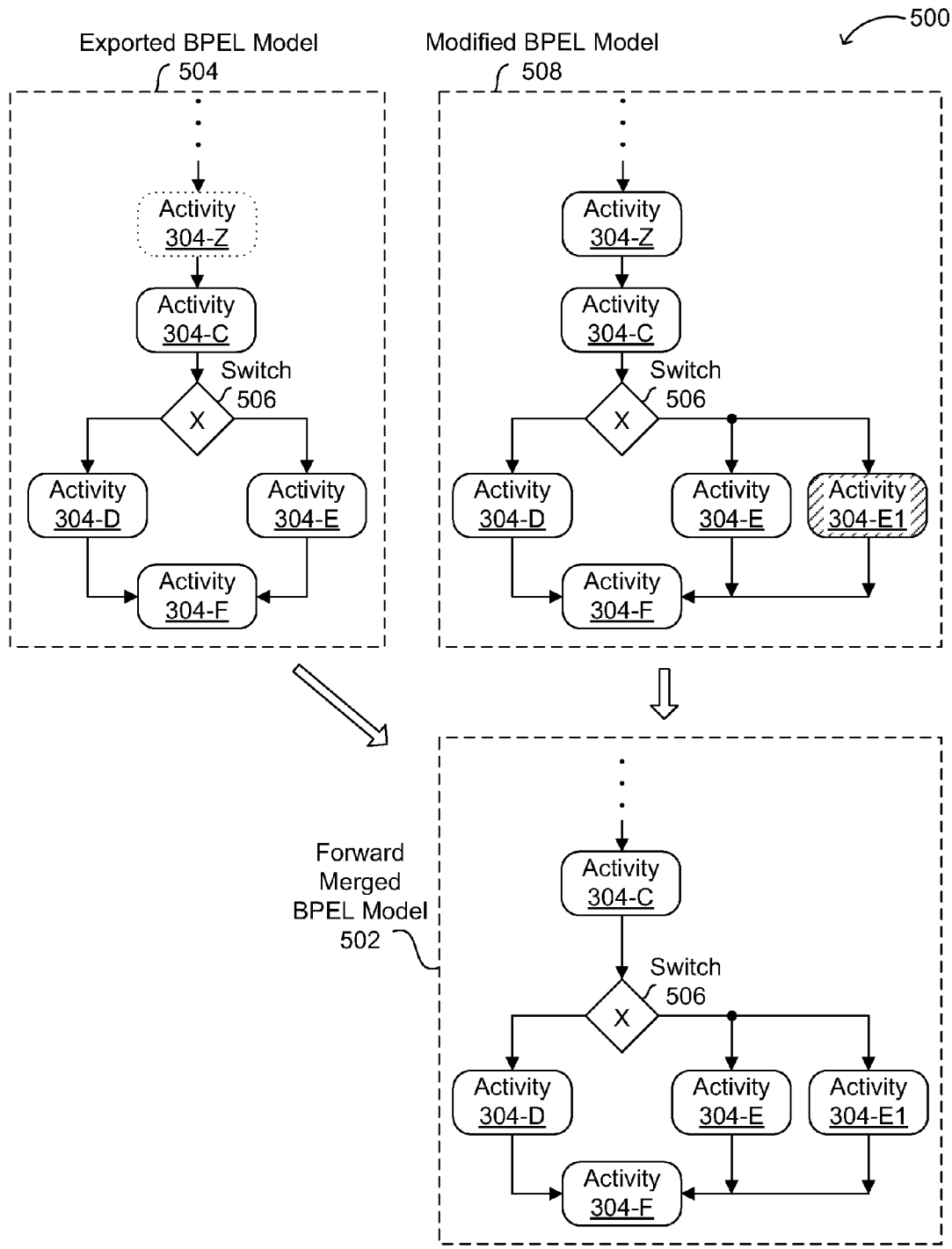
FIG. 5 illustrates a second example forward merge operation in accordance with embodiments of the present invention.

Referring now to FIG. 5, shown is an example forward merge operation 500, in accordance with embodiments of the present invention. Exported BPEL model 504 can include activity 304-C as an input to gateway or switch 506, which can support a first conditional branch via activity 304-D, and a second conditional branch via activity 304-E, to activity 304-F. Also shown in exported BPEL model 504 is removed activity 304-Z (denoted by a dotted line boundary), which was removed from the business outline. Modified BPEL model 508 can include activity 304-EL added by an IT user in parallel with activity 304-E. Thus in this case, a new branch including activity 304-EL may be added to an existing switch 506. Activity 304-Z, which was removed from the business outline, is not included in the exported BPEL model 504, but remains in modified BPEL model 508 until the forward merge operation is performed.

During the forward merge, the business process outline from the exported BPEL model is copied to the merged BPEL model. For gateways or switches existing in the business process outline, branches that have been added as part of implementation details may be added from the implementation model (e.g., modified BPEL model 508). For branches available as part of an outline generated from the BPMN process (e.g., exported BPEL model 504), the conditions are merged, and contents within the branches can be recursively merged. A forward merged BPEL model 502 can thus include activity 304-EL as part of a new branch from switch 506, as shown. Details regarding the merging of the conditions are discussed as part of attribute level merge described later on.

While modified BPEL model 508 represents an example graphical representation of one or more XML snippets representing the BPEL model, an XML snippet corresponding to modified BPEL model 508 is shown below in Table 4:

TABLE 4

```
<scope name="304-Z">
    <bpelx:annotation>
     <bpelx:pattern patternName="bpelx:automated"></bpelx:pattern>
     <bpelx:analysis>
       <bpelx:property name="BusinessId">Scope_31fb937f</bpelx:property>
       <bpelx:property name="LastUpdateDate">6/13/08 3:10:53 PM</bpelx:property>
     </bpelx:analysis>
    </bpelx:annotation>
    <invoke name="304-Z">
     <bpelx:annotation>
        <bpelx:analysis>
          <bpelx:property name="BusinessId">31fb937f</bpelx:property>
          <bpelx:property name="LastUpdateDate">6/13/08 3:10:53 PM</bpelx:property>
        </bpelx:analysis>
     </bpelx:annotation>
    </invoke>
</scope>
<scope name="304-C">
    <bpelx:annotation>
     <bpelx:pattern patternName="bpelx:automated"></bpelx:pattern>
     <bpelx:analysis>
       <bpelx:property name="BusinessId">Scope_36af0200</bpelx:property>
       <bpelx:property name="LastUpdateDate">6/13/08 3:10:53 PM</bpelx:property>
     </bpelx:analysis>
    </bpelx:annotation>
    <receive name="304-C" partnerLink="CreditService"
        portType="ns2:CreditServiceCallback" operation="onResult"
        variable="CustomerInformation">
      <bpelx:annotation>
      <bpelx:analysis>
        <bpelx:property name="BusinessId">36af0200</bpelx:property>
        <bpelx:property name="LastUpdateDate">6/13/08 3:10:53 PM</bpelx:property>
      </bpelx:analysis>
      </bpelx:annotation>
    </receive>
</scope>
<switch name="506">
  <bpelx:annotation>
   <bpelx:pattern patternName="XOR"></bpelx:pattern>
   <bpelx:analysis>
    <bpelx:property name="BusinessId">Switch_222811dd</bpelx:property>
    <bpelx:property name="LastUpdateDate">6/13/08 3:10:53 PM</bpelx:property>
   </bpelx:analysis>
  </bpelx:annotation>
  <case condition="Condition 1">
   <bpelx:annotation>
    <bpelx:analysis>
     <bpelx:property name="LastUpdateDate">5/15/08 1:48:49 PM</bpelx:property>
     <bpelx:property name="ConditionExpression">Condition 1</bpelx:property>
    </bpelx:analysis>
   </bpelx:annotation>
   <sequence>
    <scope name="304-D">
     <bpelx:annotation>
      <bpelx:pattern patternName="bpelx:automated"></bpelx:pattern>
      <bpelx:analysis>
        <bpelx:property name="BusinessId">Scope_92e2cb73</bpelx:property>
        <bpelx:property name="LastUpdateDate">6/13/08 3:10:53 PM</bpelx:property>
      </bpelx:analysis>
     </bpelx:annotation>
```

TABLE 4-continued

```xml
  <invoke name="304-D" partnerLink="AddCustomer"
    portType="ns1:AddService" operation="initiate"
    variable="inputVar">
    <bpelx:annotation>
     <bpelx:analysis>
      <bpelx:property name="BusinessId">92e2cb73</bpelx:property>
      <bpelx:property name="LastUpdateDate">6/13/08 3:10:53 PM</bpelx:property>
     </bpelx:analysis>
    </bpelx:annotation>
  </invoke>
      </scope>
      <scope name="304-F">
  <bpelx:annotation/>
   <bpelx:property name="BusinessId">Scope_31fb937f-2228-11dd-6ca1-02004c4f4f50</bpelx:property>
   <bpelx:property name="LastUpdateDate">5/15/08 1:48:33 PM</bpelx:property>
   </bpelx:analysis>
  </bpelx:annotation>
   <invoke name ="304-F" partnerLink="client" portType="tns:SubproctxnCallback">
    <bpelx:annotation>
     <bpelx:analysis>
      <bpelx:property name="BusinessId">Invoke_31fb937f-2228-11dd-6ca1-02004c4f4f50</bpelx:property>
      <bpelx:property name="LastUpdateDate">5/15/08 1:48:33 PM</bpelx:property>
     </bpelx:analysis>
    </bpelx:annotation>
   </invoke>
 </scope>
 </sequence>
</case>
<case condition="Condition 2">
 <bpelx:annotation>
  <bpelx:analysis>
   <bpelx:property name="LastUpdateDate">5/15/08 1:48:49 PM</bpelx:property>
   <bpelx:property name="ConditionExpression">Condition 2</bpelx:property>
  </bpelx:analysis>
 </bpelx:annotation>
 <sequence>
  <scope name="304-E">
   <bpelx:annotation>
    <bpelx:pattern patternName="bpelx:automated"></bpelx:pattern>
    <bpelx:analysis>
     <bpelx:property name="BusinessId">Scope_02004c4f4f50</bpelx:property>
     <bpelx:property name="LastUpdateDate">6/13/08 3:10:53 PM</bpelx:property>
    </bpelx:analysis>
   </bpelx:annotation>
   <invoke name="304-E" partnerLink="ProcessOrder"
    portType="ns3:ProcessOrder" operation="initiate"
    variable="inputVar">
    <bpelx:annotation>
     <bpelx:analysis>
      <bpelx:property name="BusinessId">02004c4f4f50</bpelx:property>
      <bpelx:property name="LastUpdateDate">6/13/08 3:10:53 PM</bpelx:property>
     </bpelx:analysis>
    </bpelx:annotation>
   </invoke>
      </scope>
      <scope name="304-F">
  <bpelx:annotation/>
   <bpelx:property name="BusinessId">Scope_31fb937f-2228-11dd-6ca1-02004c4f4f50</bpelx:property>
   <bpelx:property name="LastUpdateDate">5/15/08 1:48:33 PM</bpelx:property>
   </bpelx:analysis>
  </bpelx:annotation>
   <invoke name ="304-F" partnerLink="client" portType="tns:SubproctxnCallback">
    <bpelx:annotation>
     <bpelx:analysis>
      <bpelx:property name="BusinessId">Invoke_31fb937f-2228-11dd-6ca1-02004c4f4f50</bpelx:property>
      <bpelx:property name="LastUpdateDate">5/15/08 1:48:33 PM</bpelx:property>
     </bpelx:analysis>
    </bpelx:annotation>
   </invoke>
  </scope>
 </sequence>
</case>
<case condition="Condition 3">
 <sequence>
  <scope name="304-E1">
   <invoke name="304-E1" partnerLink="GetPriceQuote"
    portType="ns4:PriceQuote" operation="initiate"
    variable="inputVar"/>
      </scope>
      <scope name="304-F">
```

TABLE 4-continued

```
    <bpelx:annotation/>
      <bpelx:property name="BusinessId">Scope_31fb937f-2228-11dd-6ca1-02004c4f4f50</bpelx:property>
      <bpelx:property name="LastUpdateDate">5/15/08 1:48:33 PM</bpelx:property>
     </bpelx:analysis>
    </bpelx:annotation>
    <invoke name ="304-F" partnerLink="client" portType="tns:SubproctxnCallback">
     <bpelx:annotation>
      <bpelx:analysis>
       <bpelx:property name="BusinessId">Invoke_31fb937f-2228-11dd-6ca1-02004c4f4f50</bpelx:property>
       <bpelx:property name="LastUpdateDate">5/15/08 1:48:33 PM</bpelx:property>
      </bpelx:analysis>
     </bpelx:annotation>
    </invoke>
   </scope>
  </sequence>
 </case>
</switch>
```

While forward merged BPEL model 502 is shown as an example graphical representation of the XML snippets representing the BPEL model, an XML snippet corresponding to forward merged BPEL model 502 is shown below in Table 5:

TABLE 5

```
<scope name="304-C">
        <bpelx:annotation>
         <bpelx:pattern patternName="bpelx:automated"></bpelx:pattern>
         <bpelx:analysis>
          <bpelx:property name="BusinessId">Scope_36af0200</bpelx:property>
          <bpelx:property name="LastUpdateDate">6/13/08 3:10:53 PM</bpelx:property>
         </bpelx:analysis>
        </bpelx:annotation>
        <receive name="304-C" partnerLink="CreditService"
           portType="ns2:CreditServiceCallback" operation="onResult"
           variable="CustomerInformation">
          <bpelx:annotation>
           <bpelx:analysis>
            <bpelx:property name="BusinessId">36af0200</bpelx:property>
            <bpelx:property name="LastUpdateDate">6/13/08 3:10:53 PM</bpelx:property>
           </bpelx:analysis>
          </bpelx:annotation>
        </receive>
</scope>
<switch name="506">
    <bpelx:annotation>
     <bpelx:pattern patternName="XOR"></bpelx:pattern>
     <bpelx:analysis>
      <bpelx:property name="BusinessId">Switch_222811dd</bpelx:property>
      <bpelx:property name="LastUpdateDate">6/13/08 3:10:53 PM</bpelx:property>
     </bpelx:analysis>
    </bpelx:annotation>
    <case condition="Condition 1">
     <bpelx:annotation>
      <bpelx:analysis>
       <bpelx:property name="LastUpdateDate">5/15/08 1:48:49 PM</bpelx:property>
       <bpelx:property name="ConditionExpression">Condition 1</bpelx:property>
      </bpelx:analysis>
     </bpelx:annotation>
     <sequence>
      <scope name="304-D">
       <bpelx:annotation>
        <bpelx:pattern patternName="bpelx:automated"></bpelx:pattern>
        <bpelx:analysis>
         <bpelx:property name="BusinessId">Scope_92e2cb73</bpelx:property>
         <bpelx:property name="LastUpdateDate">6/13/08 3:10:53 PM</bpelx:property>
        </bpelx:analysis>
       </bpelx:annotation>
       <invoke name="304-D" partnerLink="AddCustomer"
          portType="ns1:AddService" operation="initiate"
          variable="inputVar">
         <bpelx:annotation>
          <bpelx:analysis>
           <bpelx:property name="BusinessId">92e2cb73</bpelx:property>
           <bpelx:property name="LastUpdateDate">6/13/08 3:10:53 PM</bpelx:property>
          </bpelx:analysis>
         </bpelx:annotation>
       </invoke>
      </scope>
```

TABLE 5-continued

```
        <scope name="304-F">
          <bpelx:annotation/>
            <bpelx:property name="BusinessId">Scope_31fb937f-2228-11dd-6ca1-02004c4f4f50</bpelx:property>
            <bpelx:property name="LastUpdateDate">5/15/08 1:48:33 PM</bpelx:property>
          </bpelx:analysis>
        </bpelx:annotation>
        <invoke name ="304-F" partnerLink="client" portType="tns:SubproctxnCallback">
          <bpelx:annotation>
            <bpelx:analysis>
              <bpelx:property name="BusinessId">Invoke_31fb937f-2228-11dd-6ca1-02004c4f4f50</bpelx:property>
              <bpelx:property name="LastUpdateDate">5/15/08 1:48:33 PM</bpelx:property>
            </bpelx:analysis>
          </bpelx:annotation>
        </invoke>
      </scope>
    </sequence>
  </case>
  <case condition="Condition 2">
    <bpelx:annotation>
      <bpelx:analysis>
        <bpelx:property name="LastUpdateDate">5/15/08 1:48:49 PM</bpelx:property>
        <bpelx:property name="ConditionExpression">Condition 2</bpelx:property>
      </bpelx:analysis>
    </bpelx:annotation>
    <sequence>
      <scope name="304-E">
        <bpelx:annotation>
          <bpelx:pattern patternName="bpelx:automated"></bpelx:pattern>
          <bpelx:analysis>
            <bpelx:property name="BusinessId">Scope_02004c4f4f50</bpelx:property>
            <bpelx:property name="LastUpdateDate">6/13/08 3:10:53 PM</bpelx:property>
          </bpelx:analysis>
        </bpelx:annotation>
        <invoke name="304-E" partnerLink="ProcessOrder"
            portType="ns3:ProcessOrder" operation="initiate"
            variable="inputVar">
          <bpelx:annotation>
            <bpelx:analysis>
              <bpelx:property name="BusinessId">02004c4f4f50</bpelx:property>
              <bpelx:property name="LastUpdateDate">6/13/08 3:10:53 PM</bpelx:property>
            </bpelx:analysis>
          </bpelx:annotation>
        </invoke>
            </scope>
            <scope name="304-F">
        <bpelx:annotation/>
          <bpelx:property name="BusinessId">Scope_31fb937f-2228-11dd-6ca1-02004c4f4f50</bpelx:property>
          <bpelx:property name="LastUpdateDate">5/15/08 1:48:33 PM</bpelx:property>
        </bpelx:analysis>
      </bpelx:annotation>
      <invoke name ="304-F" partnerLink="client" portType="tns:SubproctxnCallback">
        <bpelx:annotation>
          <bpelx:analysis>
            <bpelx:property name="BusinessId">Invoke_31fb937f-2228-11dd-6ca1-02004c4f4f50</bpelx:property>
            <bpelx:property name="LastUpdateDate">5/15/08 1:48:33 PM</bpelx:property>
          </bpelx:analysis>
        </bpelx:annotation>
      </invoke>
    </scope>
  </sequence>
</case>
<case condition="Condition 3">
  <sequence>
    <scope name="304-E1">
      <invoke name="304-E1" partnerLink="GetPriceQuote"
          portType="ns4:PriceQuote" operation="initiate"
          variable="inputVar"/>
            </scope>
            <scope name="304-F">
        <bpelx:annotation/>
          <bpelx:property name="BusinessId">Scope_31fb937f-2228-11dd-6ca1-02004c4f4f50</bpelx:property>
          <bpelx:property name="LastUpdateDate">5/15/08 1:48:33 PM</bpelx:property>
        </bpelx:analysis>
      </bpelx:annotation>
      <invoke name ="304-F" partnerLink="client" portType="tns:SubproctxnCallback">
        <bpelx:annotation>
          <bpelx:analysis>
            <bpelx:property name="BusinessId">Invoke_31fb937f-2228-11dd-6ca1-02004c4f4f50</bpelx:property>
            <bpelx:property name="LastUpdateDate">5/15/08 1:48:33 PM</bpelx:property>
          </bpelx:analysis>
```

TABLE 5-continued

```
      </bpelx:annotation>
    </invoke>
   </scope>
  </sequence>
  </case>
</switch>
```

Figure 6:
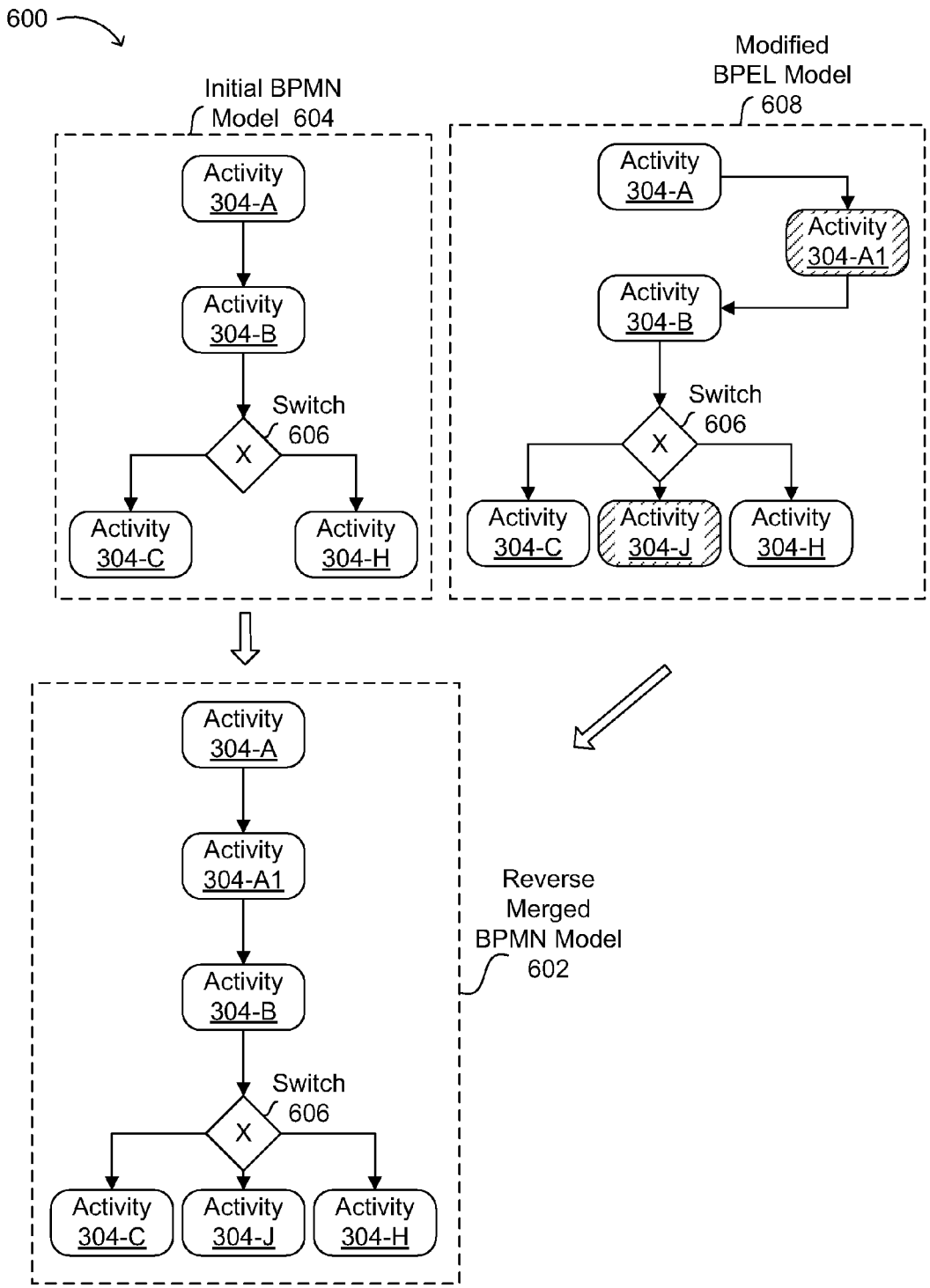
FIG. 6 illustrates an example reverse merge operation in accordance with embodiments of the present invention.

Referring now to FIG. 6, shown is an example 600 reverse merge operation in accordance with embodiments of the present invention. This particular example generally follows the forward merge examples shown above (e.g., in FIGS. 3 and 4), except with additional branches. In this example, switch 606 with branches to activities 304-C and 304-H follows activity 304-B. Here, activity 304-A1 is added between activities 304-A and 304-B in modified BPEL model 608. Because activity 304-A is found in BPMN model 604 for anchoring, added activity 304-A1 is anchored to previous activity 304-A in reverse merged BPMN model 602. Also, a branch to activity 304-J from switch 606 is added in modified BPEL model 608 after activity 304-B, with other branches going to activities 304-C and 304-H. Because switch 606 is found in BPMN model 604, activity 304-J is anchored as shown in reverse merged BPMN model 602.

Figure 7:
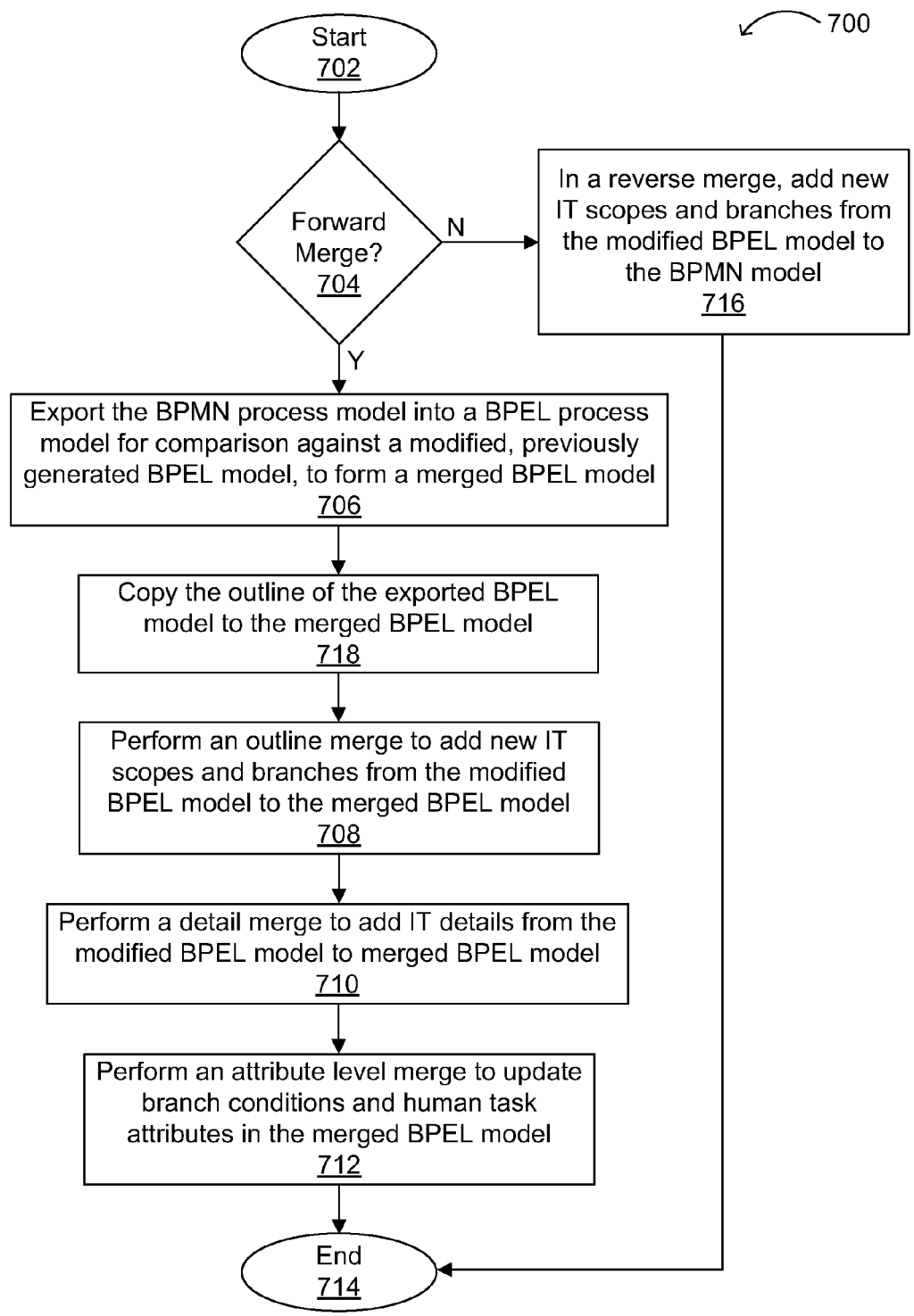
FIG. 7 is a flow diagram showing example forward and reverse merge operations in accordance with embodiments of the present invention.

Referring now to FIG. 7, shown is a flow diagram of example forward and reverse merge operations 700 in accordance with embodiments of the present invention. The flow begins (702), and if a reverse merge operation is to take place (704), new IT scopes and branches from a modified BPEL model can be added to the BPMN model (716). Thus for a reverse merge operation, change can be made into the business process (e.g., a BPMN model) in a substantially lossless fashion. Further details of a reverse merge operation will be discussed first, and will be followed by additional forward merge operation details.

For example, IT scopes in a BPEL model may be mapped to automated activities, human activities, or any suitable type of activity, in a BPMN process. A reverse merge may include an outline merge operation whereby the IT scopes are added to the BPMN process model by anchoring the IT scopes to a previous activity or next activity (if the previous activity is not available), in that order. In the event that neither of the previous or the next activity are available, subsequent previous and next activities are used. For switches and flows, any IT added branches may then be added to the BPMN process model. Anchoring may be done using unique identifiers for activities.

In a reverse merge operation, there may be no need to do an attribute level merge, as may be performed with reference to forward merge operations. This is because a business user typically does not have the level of details that an IT user sees. In this fashion, only the activity level changes made to an IT process model are taken and propagated as changes in the BPMN model.

Reverse merge operations in particular embodiments may utilize an executable model (e.g., a BPEL model) to construct a hash map that contains the IT detail activities, along with the identifiers of their previous and next activities, if any. Each such activity may be recursively tagged to a previous or next activity in the business process model using the identifiers. In the case of new branches added to gateways or switches in the executable BPEL model, a previous identifier may be considered null, and a next identifier can be a next branch in the gateway.

As part of ensuring correctness and avoiding inconsistent states during the process lifecycle and merge operation, once a reverse merge is performed, further export, synchronization or upload operations may be halted until the business process outline changes effected by the merge are accepted or rejected.

If a forward merge operation (704) is to be performed, the forward merge can include an activity level merge and an attribute level merge. Further, the activity level merge can include an outline merge and a detail merge. A BPMN model may be exported or converted into a BPEL in order to provide common ground for comparison (706). An outline of the exported BPEL model can then be copied to the merged BPEL model (718). Next, an outline merge can be performed to add new IT scopes and branches from the modified BPEL model to the merged BPEL model (708). Next, a detailed merge can be performed to add IT details from the modified BPEL model to the merged BPEL model (710). An attribute level merge can then be performed to update branch conditions as well as some of task attributes in the merged BPEL model (712), completing the flow (714).

Figure 8:
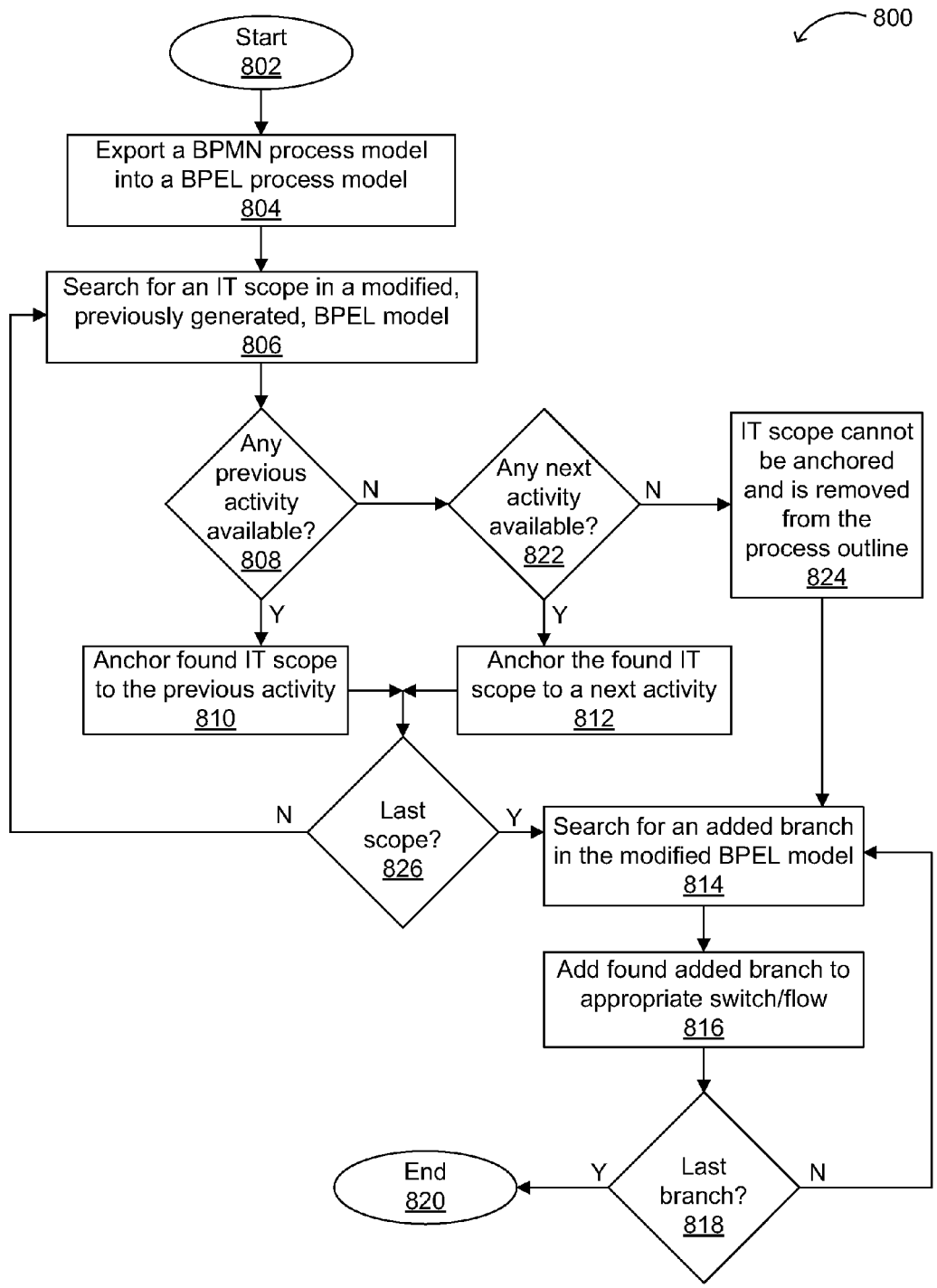
FIG. 8 is a flow diagram of an example outline level activity merge for a forward merge operation in accordance with embodiments of the present invention.

Referring now to FIG. 8, shown is a flow diagram of an example outline level activity merge 800 for a forward merge operation in accordance with embodiments of the present invention. The flow begins (802), and a business process model (e.g., BPMN) may be exported into a BPEL process model (804). A search can occur for an IT scope in a modified and previously generated BPEL model (806). The IT scopes can be added to the generated or exported BPEL process model by anchoring them to any of the previous activities or subsequent activities (if any of the previous activities is not available), in that order. Thus, if a previous activity is available (808), the found IT scope may be anchored to the previous activity (810). However, if no previous activity is available (808), a check of a next available activity can be made (822), and a found IT scope may be anchored to a next activity (812). However, if no previous (808) or next (822) activities are found after successive expanding searches, the IT scope may not be anchored and may be removed from the process outline (824). A search loop can repeat as shown until a last scope (826) is found.

For switches and flows found in a search in the modified BPEL model (814), any IT added branches can be added to the appropriate switch (816) or flow in the merged BPEL model. If there are additional scopes and/or branches (818), the flow can return to searching for an IT scope (806). However, if no further scopes or branches remain (818) in the modified, previously generated, BPEL model, the flow can complete (820). In this fashion, the outline of the process is taken from the business process model and any IT detail activities and branches added by the IT user may be included in the process outline by either tagging the activity/branch to a preceding or succeeding activity available in the business process model. An outline at the implementation level can thus include scopes and gateways.

Once the outline level merge has been completed, a detail level merge can be performed. In the detail level merge, a determination is made for each activity to see if the exported BPEL model (from the business user) has been changed more recently than the modified BPEL model (from the IT user). This may be done by matching the activities in the exported BPEL model and the modified BPEL model by relating the identifiers in the previously constructed Hash Maps, as discussed above, and comparing their timestamps. If the business user has made the more recent change to a given activity, details of the activity from the modified BPEL model (which applied to a previous activity version) are not included in the merged BPEL model. In this case, the activity is retained in the merged BPEL model as in the exported BPEL model such that the most recent change to the business outline made by the Business user is reflected in the merged BPEL model, thus providing the IT user with the latest change. However, if the activity timestamps match, indicating that the business user has not updated a particular activity, the activity details (which still apply since the activity has not changed) from the modified BPEL model can be added to the appropriate scope in the merged BPEL mode. The rationale for the above logic being the fact that the business user changes to the process outline generally take precedence over the IT user changes.

Figure 9:
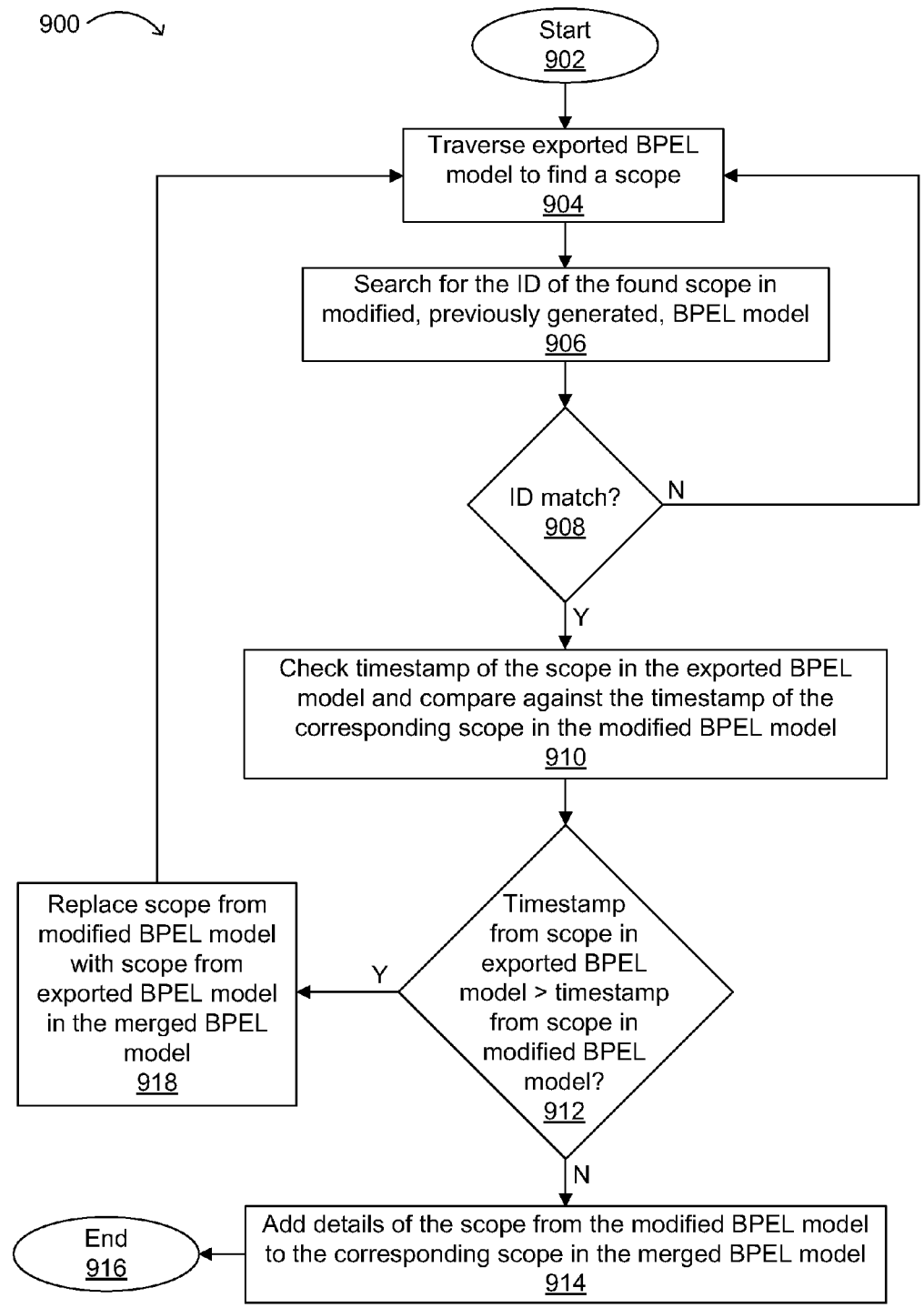
FIG. 9 is a flow diagram of an example detail level activity merge for a forward merge operation in accordance with embodiments of the present invention.

Referring now to FIG. 9, shown is a flow diagram of an example detail level activity merge 900 for a forward merge operation in accordance with embodiments of the present invention. The flow begins (902) and a generated or exported BPEL process model can be traversed to find a scope (904). When a scope is encountered, a search can be performed for the identification of the found scope in the modified, previously generated, BPEL model (906). If it is verified that a scope with the same identification exists in the modified BPEL process model (908), a comparison of timestamps of the scope in the exported BPEL model (from the business user) and that of the corresponding scope in the modified BPEL model (from the IT user) can be made (910). This timestamp comparison helps to determine if the business user has made a recent change to that activity in the business process outline (BPMN), from the previous time the activity was translated to a BPEL model.

If the timestamp from a scope in the exported BPEL model is less than or equal to a timestamp from a corresponding scope in the modified BPEL model (912), indicating that a last update by the business user has not changed the timestamp (no changes made to that particular activity), details of the scope from the modified BPEL process model can be added into the same scope in the merged BPEL process model (914), thus completing the flow (916). However, if the timestamp from the scope in the exported BPEL model is greater than a timestamp from a corresponding scope in the modified BPEL model (912), indicating that a last update by the business user has in fact made changes to that particular activity, the scope from the modified BPEL model (IT user side) may be ignored and instead the corresponding scope from the exported BPEL model is included in the forward merged BPEL model (918).

Thus for a detail level merge, an outline may already exist. The modified BPEL model may be traversed to see if there is a same unique identifier, and check to see if timestamp has changed, as compared with the timestamp of a corresponding scope of the exported BPEL process. As discussed above, if there has been a timestamp change, then the updated version from the business side can be included in the merged model. If the timestamp has not changed, details in the scope may be considered to see if anything has been changed therein. Each scope is a container for a set of activities, and/or may contain other lower scope levels therein. The algorithm in particular embodiments can be programmed to stop the merge detail at any such level. For example, a scope can contain two or more scopes. If the top-level scope has changed, a flow can proceed in top-down fashion to determine if a lower level scope within the top level scope has changed. Further, in addition to timestamps for determining last updates, other approaches can also be used (e.g., sequence numbers, flags, etc.).

Figure 10:
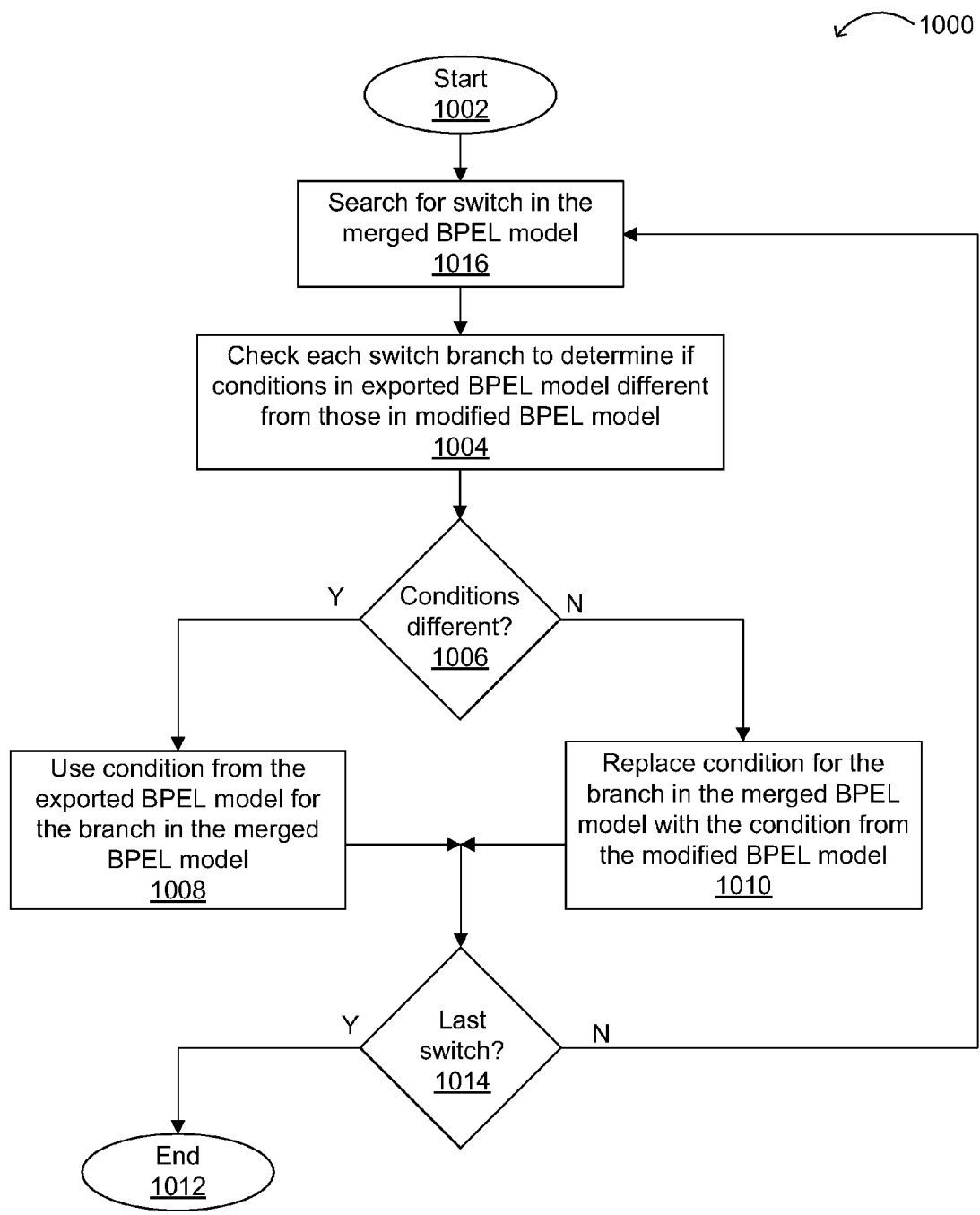
FIG. 10 is a flow diagram of an example attribute level merge for a forward merge operation in accordance with embodiments of the present invention.

Referring now to FIG. 10, shown is a flow diagram of an example attribute level merge 1000 for a forward merge operation in accordance with embodiments of the present invention. Each activity of a business process (BPMN) may have one or more attributes associated therewith. For example, a switch might have a condition expression, such as "if an expense has been approved", then take a designated branch. This is to be able to specify how the process flow is affected by certain business conditions. The attribute values specified by the business user can be maintained as part of the business flow implementation in the form of annotations, and later these values may be compared against the corresponding attributes derived from a future version/revision of the business user model. This is done through BPEL code comparison using XML. Thus the code is essentially checked to see if there is any change between the current value of the attribute in the exported BPEL model (derived from the BPMN model) and the previous value of the same attribute maintained in the business flow Implementation (modified BPEL Model). As an extension, Particular embodiments may also include a timestamp for each attribute of activities and the process, in addition to timestamps just for activities. So, a timestamp may be extended to cover attributes as well as activities in particular embodiments.

An exported BPEL model (e.g., from the business user) can have the condition expression attribute specified by the business user: (i) as part of the normal process flow, which can be modified by the IT user during his implementation; and (ii) as part of annotations on the branches of the switch which may not be modified by the IT user. Annotations are extensions to the BPEL XML snippets specifically used for storing attribute values. During a time when a forward merge operation is performed, a comparison can be made of the business user's branch condition in an exported BPEL model to the previous business user's branch condition, which is stored as an annotation in the modified BPEL model. A comparison of these conditions can be made in automated fashion. An example of such an XML annotation is shown below in Table 6:

TABLE 6

```
<switch name="506">
  <bpelx:annotation>
    <bpelx:pattern patternName="XOR"></bpelx:pattern>
    <bpelx:analysis>
      <bpelx:property name="BusinessId">Switch_222811dd</bpelx:property>
      <bpelx:property name="LastUpdateDate">6/13/08 3:10:53 PM</bpelx:property>
    </bpelx:analysis>
  </bpelx:annotation>
  <case condition="Condition 1">
    <bpelx:annotation>
    <bpelx:analysis>
      <bpelx:property name="LastUpdateDate">5/15/08 1:48:49 PM</bpelx:property>
```

TABLE 6-continued

```
        <bpelx:property name="ConditionExpression">Condition 1</bpelx:property>
      </bpelx:analysis>
    </bpelx:annotation>
    <sequence>
      ....
    </sequence>
  </case>
</switch>
```

In FIG. 10, the flow begins (1002), and each branch of a switch can be checked to determine if the condition in the exported BPEL process model is different from those in the modified BPEL model (1004). If the conditions are different (1006), the condition from the exported BPEL model can be used (1008), completing the flow (1012). However, if the conditions are a same (1006), the conditions may be replaced in the exported BPEL model with the condition from the modified BPEL model, thus completing the flow (1012). Similarly, each of the attributes of each of the human tasks, can be verified as to having changed in the business process (e.g., BPMN model) either using BPEL code comparisons or using a timestamp.

Figure 11:
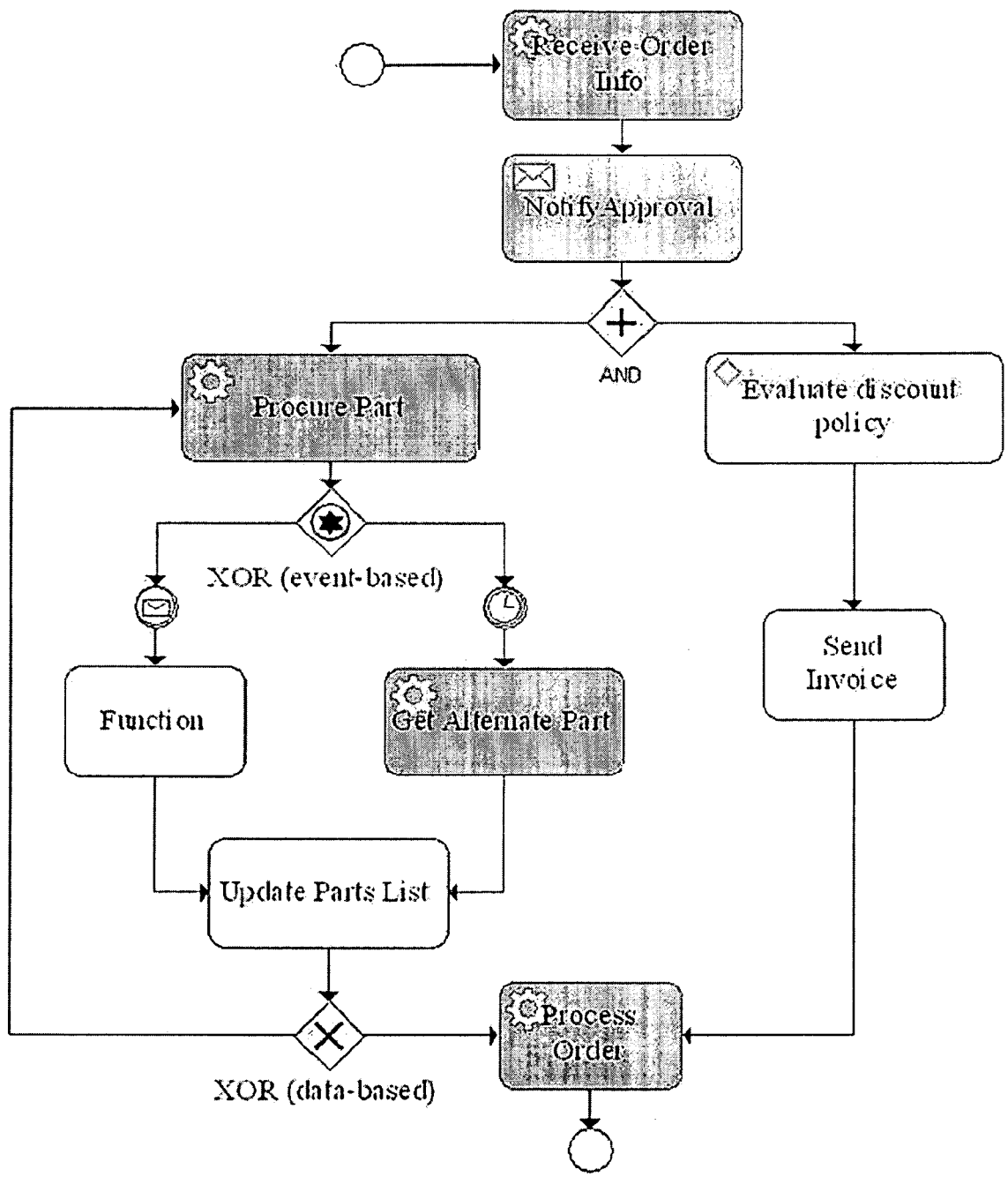
FIG. 11 is a diagram of an example BPMN model suitable for use in accordance with embodiments of the present invention.
Figure 12:
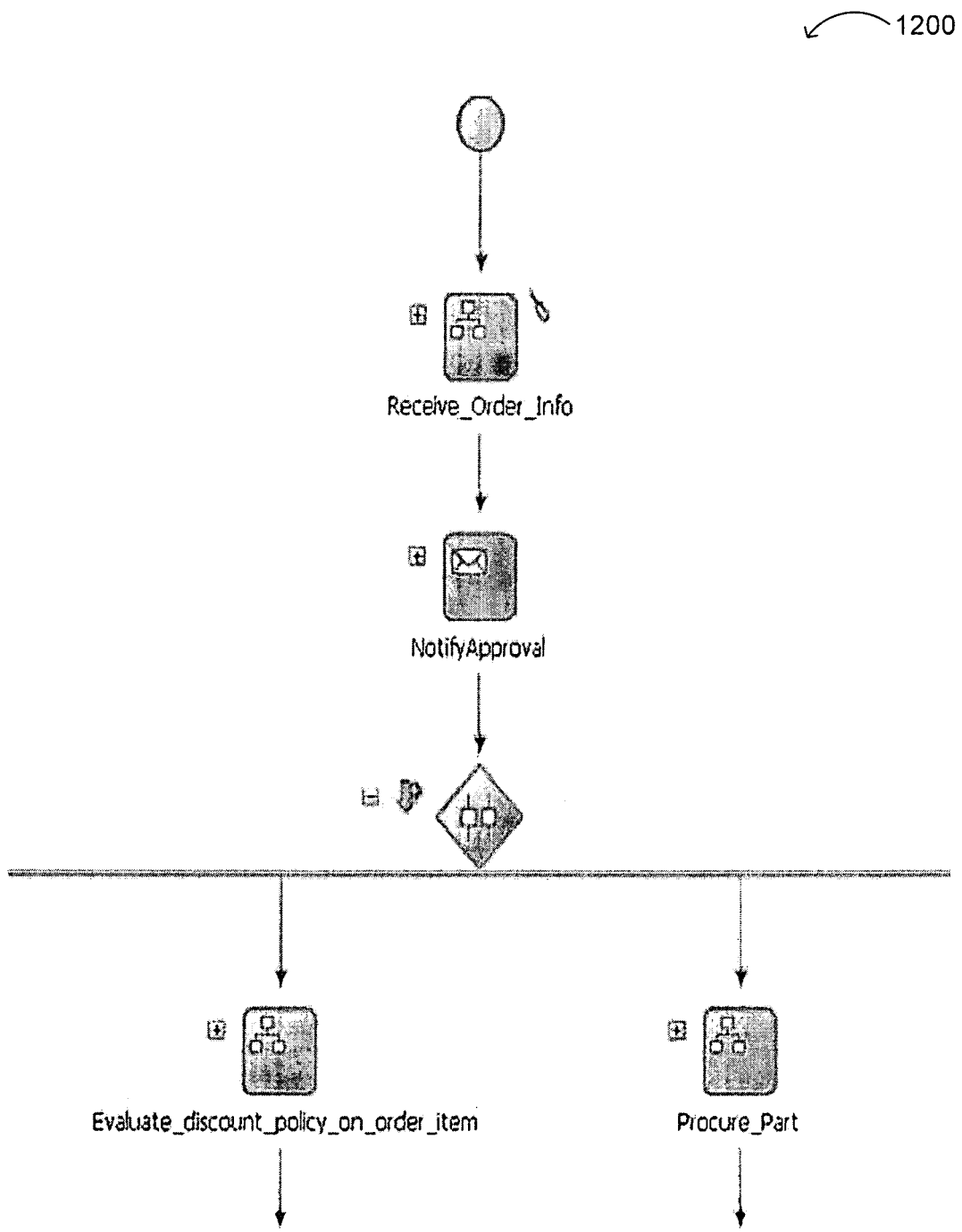
FIG. 12 is a diagram of an example BPEL model suitable for use in accordance with embodiments of the present invention.

FIGS. 11 and 12 show sample BPMN and BPEL model graphical representations. FIG. 11 shows an example (1100) BPMN model, and FIG. 12 shows an example (1200) BPEL model.

Particular embodiments can provide substantially no loss of process related data during merging, and this includes information specified by a business user and executable artifacts and/or information added by an IT user. Further, a business user may be assigned as owner of the process outline and high level process related data, while an IT user is assigned precedence over implementation details.

Particular embodiments support forward merging whereby model information may be translated to an IT implementation, but the implementation details specified by an IT user may also be reverse merged into the business process model. Particular embodiments may provide intelligent integration of a business process model to an executable counterpart thus allowing for seamless round tripping and substantially lossless translation of information (e.g., activities, attributes, etc.) from one to the other.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a computer system, of performing a merge operation where changes included in a second version of a first exported Business Process Execution Language (BPEL) implementation and an information technology (IT)-side modified version of the first exported BPEL implementation are propagated to a merged BPEL implementation, wherein the first exported BPEL implementation includes activities in a first business process flow modeled by a first Business Process Modeling Notation (BPMN) model, the second version of the first exported BPEL implementation includes changes made by a business unit to the activities included in the first exported BPEL implementation, the IT-side modified version of the first exported BPEL implementation has changed IT scopes and/or activities added by an IT unit subsequent to generation of the first exported BPEL implementation and a scope is a logical collection of activities, the method comprising:

when the merge operation is a forward merge operation:
copying, by the computer system, an outline of the second version of the first exported BPEL implementation to the merged BPEL implementation;

adding, by the computer system, modified IT scopes from the IT-side modified version of the first exported BPEL implementation to the merged BPEL implementation to perform an outline merge, where modified IT scopes from the IT-side modified version of the first exported BPEL implementation are added to the merged BPEL implementation either by anchoring added IT scopes to a previous activity in the merged BPEL implementation or by anchoring added IT scopes to a subsequent activity in the merged BPEL implementation if a previous activity is not available;

matching, by the computer system, activities in the second version of the first exported BPEL implementation and the IT-side modified version of the first exported BPEL implementation by comparing previously created hash map identifiers for each activity timestamps;

creating, by the computer system, a timestamp capturing a last update time of an activity in the second version of the first exported BPEL model;

creating, by the computer system, a timestamp capturing a last update time of an activity in the IT-side modified version of the first exported BPEL model;

comparing, by the computer system, timestamps to determine if an activity in the second version of the first exported BPEL implementation has been changed more recently than a matched activity in the IT-side modified version of the first exported BPEL implementation;

copying details of a matched activity of the IT-side modified version of the first exported BPEL implementation to the merged BPEL implementation only when the matched activity in the IT-side modified version of the first exported BPEL implementation has been changed more recently than a matched activity in the second version of the first exported BPEL implementation to establish precedence of business unit changes over IT unit changes; and performing, by the computer system, an attribute level merge for updated branch conditions in the merged BPEL implementation by replacing conditions for a switch in the merged BPEL implementation with conditions from the same switch in the IT-side modified version of the first exported BPEL implementation if the conditions are different;

and when the merge operation is a reverse merge operation:
converting the IT-side modified version of the first exported BPEL implementation to a modified BPMN model; and adding scopes and branches from the modified BPMN model to a merged BPMN model including changes made by the business unit to the first BPMN model.

2. The method of claim 1 further comprising:
generating, by the computer system, a first hash map having identifiers associated with activities in the second version of the first BPEL implementation; and
generating, by the computer system, a second hash map having identifiers associated with activities in the IT-side modified version of the first BPEL implementation.

3. The method of claim 1 further comprising:
comparing conditions in the second version of the first BPEL implementation to branch conditions in the IT-side modified version of the first BPEL implementation.

4. The method of claim 1 wherein a performing the activity level detail merge comprises:
traversing the merged BPEL implementation to find a scope, the found scope having an identification; and
searching for the found scope identification in the IT-side modified version of the first BPEL implementation.

5. The method of claim 1 wherein performing an attribute level merge comprises:
comparing conditions of each switch branch in the second version of the first BPEL implementation with those of the IT-side modified version of the first BPEL implementation.

6. The method of claim 5 further comprising:
using a condition from the second version of the first BPEL implementation in the merged BPEL implementation when the compared conditions are different.

7. The method of claim 5 further comprising:
replacing a condition in the second version of the first BPEL implementation with a corresponding condition from the IT-side modified version of the first BPEL implementation in the merged BPEL implementation model when the compared conditions are the same.

8. The method of claim 5 wherein comparing the conditions comprises comparing code segments.

9. The method of claim 5 wherein comparing the conditions comprises comparing attribute level timestamps.

10. The method of claim 5 further comprising merging human task attributes into the merged BPEL implementation.

11. The method of claim 1 further comprising receiving a request for the forward merge operation from an IT user.

12. The method of claim 1 further comprising receiving a request for the reverse merge operation from a business user.

13. An apparatus that performs a merge operation where changes included in a second version of a first exported Business Process Execution Language (BPEL) implementation and an information technology (IT)-side modified version of the first exported BPEL implementation are propagated to a merged BPEL implementation, wherein the first exported BPEL implementation includes activities in a first business process flow modeled by a first Business Process Modeling Notation (BPMN) model, the second version of the first exported BPEL implementation includes changes made by a business unit to the activities included in the first exported BPEL implementation, the IT-side modified version of the first exported BPEL implementation has changed IT scopes and/or activities added by an IT unit subsequent to generation of the first exported BPEL implementation and a scope is a logical collection of activities, the apparatus comprising:
one or more processors; and
logic encoded in one or more non-transitory tangible media for execution by the one or more processors, and when executed operable to:
when the merge operation is a forward merge operation:
copy an outline of the second version of the first exported BPEL implementation to the merged BPEL implementation;
add modified IT scopes from the IT-side modified version of the first exported BPEL implementation to the merged BPEL implementation to perform an outline merge, where modified IT scopes from the IT-side modified version of the first exported BPEL implementation are added to the merged BPEL implementation either by anchoring added IT scopes to a previous activity in the merged BPEL implementation or by anchoring added IT scopes to a subsequent activity in the merged BPEL implementation if a previous activity is not available;
match activities in the second version of the first exported BPEL implementation and the IT-side modified version of the first exported BPEL implementation by comparing previously created hash map identifiers for each activity timestamps;

create a timestamp capturing a last update time of an activity in the second version of the first exported BPEL model;
create a timestamp capturing a last update time of an activity in the IT-side modified version of the first exported BPEL model;
compare timestamps to determine if an activity in the second version of the first exported BPEL implementation has been changed more recently than a matched activity in the IT-side modified version of the first exported BPEL implementation;
copy details of a matched activity of the IT-side modified version of the first exported BPEL implementation to the merged BPEL implementation only when the matched activity in the IT-side modified version of the first exported BPEL implementation has been changed more recently than a matched activity in the second version of the first exported BPEL implementation to establish precedence of business unit changes over IT unit changes; and
perform an attribute level merge for updated branch conditions in the merged BPEL implementation by replacing conditions for a switch in the merged BPEL implementation with conditions from the same switch in the IT-side modified version of the first exported BPEL implementation if the conditions are different; and
when the merge operation is a reverse merge operation:
convert the IT-side modified version of the first exported BPEL implementation to a modified BPMN model; and
add scopes and branches from the modified BPMN model to a merged BPMN model including changes made by the business unit to the first BPMN model.

14. A non-transitory computer-readable storage device, comprising:
one or more instructions for determining a merge operation to perform;
one or more instructions for performing a merge operation where changes included in a second version of a first exported Business Process Execution Language (BPEL) implementation and an information technology (IT)-side modified version of the first exported BPEL implementation are propagated to a merged BPEL implementation, wherein the first exported BPEL implementation includes activities in a first business process flow modeled by a first Business Process Modeling Notation (BPMN) model, the second version of the first exported BPEL implementation includes changes made by a business unit to the activities included in the first exported BPEL implementation, the IT-side modified version of the first exported BPEL implementation has changed IT scopes and/or activities added by an IT unit subsequent to generation of the first exported BPEL implementation and a scope is a logical collection of activities;
when the determined merge operation is a forward merge operation:
one or more instructions for copying an outline of the second version of the first exported BPEL implementation to the merged BPEL implementation;
one or more instructions for adding modified IT scopes from the IT-side modified version of the first exported BPEL implementation to the merged BPEL implementation to perform an outline merge, where modified IT scopes from the IT-side modified version of the first exported BPEL implementation are added to the merged BPEL implementation either by anchoring added IT scopes to a previous activity in the merged BPEL implementation or by anchoring added IT scopes to a subsequent activity in the merged BPEL implementation if a previous activity is not available;
one or more instructions for matching activities in the second version of the first exported BPEL implementation and the IT-side modified version of the first exported BPEL implementation by comparing previously created hash map identifiers for each activity timestamps;
one or more instructions for creating a timestamp capturing a last update time of an activity in the second version of the first exported BPEL model;
one or more instructions for creating a timestamp capturing a last update time of an activity in the IT-side modified version of the first exported BPEL model;
one or more instructions for comparing timestamps to determine if an activity in the second version of the first exported BPEL implementation has been changed more recently than a matched activity in the IT-side modified version of the first exported BPEL implementation;
one or more instructions for copying details of a matched activity of the IT-side modified version of the first exported BPEL implementation to the merged BPEL implementation only when the matched activity in the IT-side modified version of the first exported BPEL implementation has been changed more recently than a matched activity in the second version of the first exported BPEL implementation to establish precedence of business unit changes over IT unit changes; and
one or more instructions performing an attribute level merge for updated branch conditions in the merged BPEL implementation by replacing conditions for a switch in the merged BPEL implementation with conditions from the same switch in the IT-side modified version of the first exported BPEL implementation if the conditions are different; and
when the merge operation is a reverse merge operation:
one or more instructions for converting the IT-side modified version of the first exported BPEL implementation to a modified BPMN model; and
one or more instructions for adding scopes and branches from the modified BPMN model to a merged BPMN model including changes made by the business unit to the first BPMN model.

* * * * *

UNITED STATES PATENT AND TRADEMARK OFFICE
CERTIFICATE OF CORRECTION

PATENT NO. : 9,015,648 B2  
APPLICATION NO. : 12/200762  
DATED : April 21, 2015  
INVENTOR(S) : Radhakrishnan et al.

It is certified that error appears in the above-identified patent and that said Letters Patent is hereby corrected as shown below:

In the Specification

In column 11, line 7, delete "304-EL" and insert -- 304-E1 --, therefor.

In column 11, line 9, delete "304-EL" and insert -- 304-E1 --, therefor.

In column 12, line 9, delete "304-EL" and insert -- 304-E1 --, therefor.

In the Claims

In column 28, line 10, in Claim 14, delete "BP EL" and insert -- BPEL --, therefor.

In column 28, line 38, in Claim 14, delete "BP EL" and insert -- BPEL --, therefor.

Signed and Sealed this  
Sixteenth Day of February, 2016

Michelle K. Lee  
*Director of the United States Patent and Trademark Office*